US 8,567,729 B2

(12) United States Patent
Nemish

(10) Patent No.: US 8,567,729 B2
(45) Date of Patent: Oct. 29, 2013

(54) LOCKING MECHANISM FOR A FRAME

(76) Inventor: Stephen C. Nemish, Valley Park, MO (US)

( * ) Notice: Subject to any disclaimer, the term of this patent is extended or adjusted under 35 U.S.C. 154(b) by 351 days.

(21) Appl. No.: 13/009,344

(22) Filed: Jan. 19, 2011

(65) Prior Publication Data

US 2012/0181407 A1    Jul. 19, 2012

(51) Int. Cl.
*F16M 11/24* (2006.01)

(52) U.S. Cl.
USPC ............... 248/125.8; 248/125.2; 248/161; 248/157

(58) Field of Classification Search
USPC ............ 248/125.8, 157, 161, 122.1, 125.1, 248/125.2, 404, 410, 411, 414, 419, 420; 211/24, 207; 157/14, 21
See application file for complete search history.

(56) References Cited

U.S. PATENT DOCUMENTS

| 1,772,240 | A | * | 8/1930 | Burk | 248/412 |
| 1,859,223 | A | * | 5/1932 | Stevenson | 248/412 |
| 2,096,998 | A | * | 10/1937 | Ronn | 164/255 |
| 2,127,279 | A | * | 8/1938 | Willoughby | 73/669 |
| 5,408,938 | A | * | 4/1995 | Genest | 100/106 |
| 7,552,900 | B2 | * | 6/2009 | Yoon | 248/412 |

* cited by examiner

*Primary Examiner* — Steven Marsh
(74) *Attorney, Agent, or Firm* — Charles McCloskey

(57) ABSTRACT

A locking mechanism provides a base connected to a column. The base, generally square, receives the round column. The base has feet and an opposite lower plate. Within one foot, a pedal extends into the base and engages the column to raise it. Upwardly from the lower plate, the column has an upper plate, a side plate outwardly from the upper plate, and a plurality of bolts secured through the pattern of apertures in the two plates. The side plate has an aperture that receives a stem that has a handle upon one end and a tab upon the opposite end. Turning of the handle places the tab beneath the lower plate, locking the column to the base while turning the handle in the opposite direction moves the tab away from the lower plate so that the column may elevate.

8 Claims, 6 Drawing Sheets

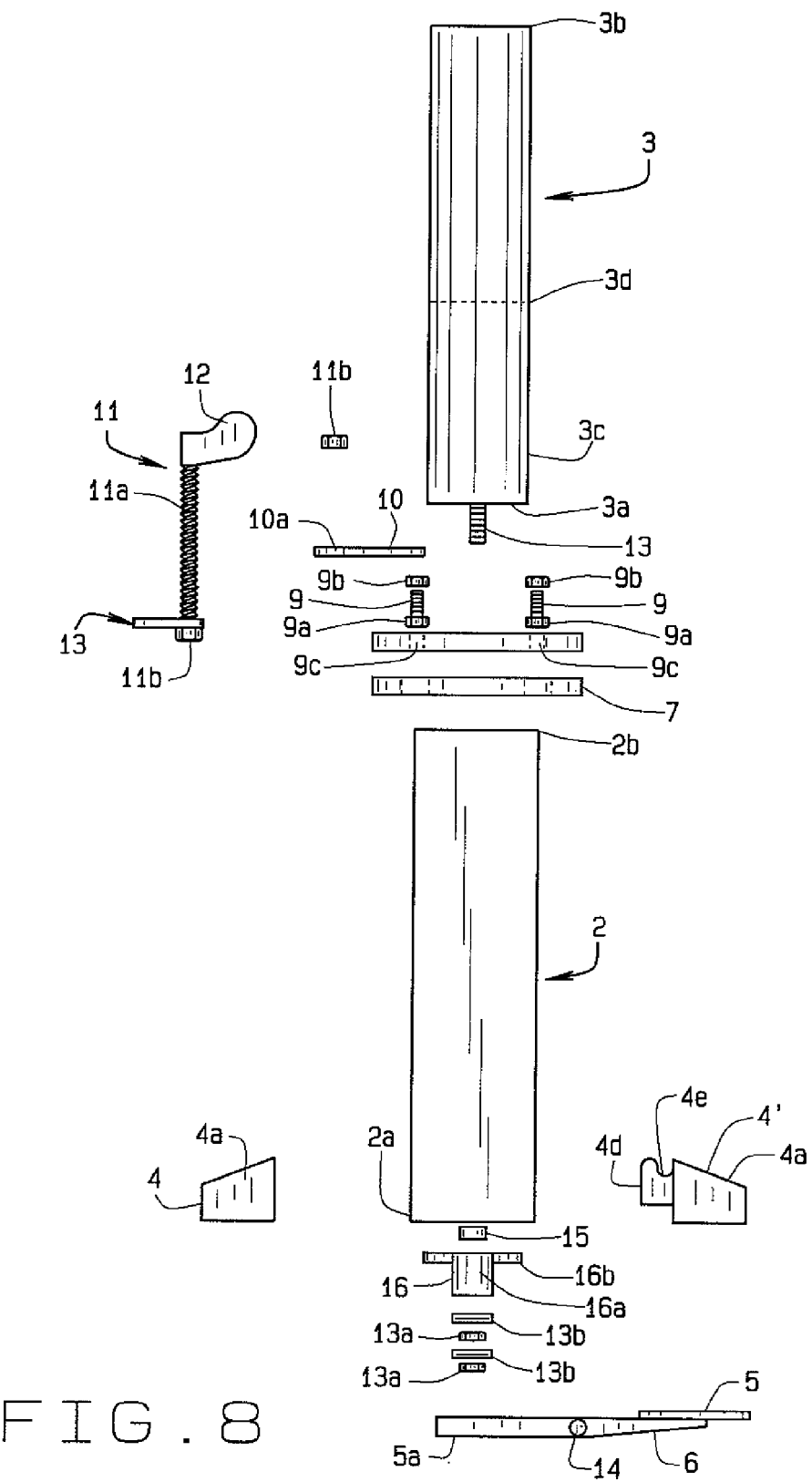

LOCKING MECHANISM FOR A FRAME

BACKGROUND OF THE INVENTION

The locking mechanism for a frame relates generally to tire changing machinery and more specifically to a pivoting columnar frame member.

In shops and garages, workers and owners change tires from rims of wheels in large numbers each day. Tires have spaced apart sidewalls, upon both sides of the tire, which extend partially towards the center. At the innermost portion of the sidewall, the tire has an encased bead. The bead is a thickened portion of the sidewall surrounding metal wire. A wheel generally has two parallel rims upon its circumference, on both sides of the wheel. The rims have a greater diameter than the substantial portion of the circumference.

Tire changing involves mounting a tire upon a wheel or removing a tire from a wheel. For mounting, a worker clamps the wheel into a fixed position. One bead is placed over a rim as much as possible and then mechanical means stretch the remainder of the bead over the rim. The second bead undergoes the same procedure. Inflating the tire then seats both beads against their respective rims. For removing a tire, the worker also clamps the wheel into a fixed position. The tire is partially deflated and then mechanical means is inserted between a bead and a rim. The mechanical means stretches a small portion of the bead over the rim. Continuing to operate, the mechanical means then lifts the remainder of the bead over the rim. As before, the second bead undergoes the same demounting procedure.

Wheels see use upon many vehicles of all descriptions. On utility vehicles, the appearance of wheels matters less so than on personal vehicles. For automobiles, motorcycles, some boat trailers, and some aircraft, the wheels and their appearance have high importance to their drivers. People often place great emphasis on the appearance of wheels as part of the image of the vehicle, and more likely, their self image. The aftermarket in wheels of all kinds remains enormous. Often, people seek out shiny or novelty wheels to separate one vehicle from the next. In particular, motorcycles have various chrome and shiny parts particularly shiny wheels including spokes and rims. Motorcycle owners take great pride in their machines and have a low tolerance for scuffs and scratches on wheels from mechanics.

DESCRIPTION OF THE PRIOR ART

Traditionally, wheels, even shiny wheels, have been clamped for tire changing and other procedures. In a prior art frame, a wheel is placed upon a three armed frame and a shaft descends to and often through the hub of the wheel. Then one or more heavy steel jaws advance and grasp the rim of a wheel. The heavy jaws often mar the rim of a wheel.

In particular, a motorcycle tire changer has a three armed frame with steel jaws to grasp a wheel. The three arms have an equiangular arrangement and a jaw pivotally mounts upon each arm. Each jaw has two upright sides with an edge to grasp the rim. The two sides allow each jaw to grasp a round rim tightly. Generally, the jaws have a U shaped cross section of varying height. The jaws upon two arms are positioned at fixed lengths along the arms. The jaw upon the third arm can be adjustably positioned using a hand crank. The hand crank turns a threaded shaft connected to the jaw. The jaw on the third arm then locks the wheel upon the frame.

With the wheel secured, a worker positions a shaft into the hub where the shaft is generally perpendicular to the wheel. The shaft provides a fulcrum for mechanical means used to mount and demount tires. The shaft extends upward to a gantry arm spaced well above a wheel. The gantry arm extends outwardly from the shaft, generally away from the three armed frame, usually opposite from where a worker stands. The gantry arm then joins to a column generally parallel to the shaft, that is, perpendicular to the supporting surface for the entire frame assembly. The column connects into a leg of the frame assembly so that the column rotates axially thus swinging the gantry arm away from a wheel as needed. The column has one aperture that aligns with a spring loaded pin where the pin engages the aperture, aligning the column and the gantry arm so that the shaft aligns with the center of the three arm frame.

The prior art frame assembly though includes a bead breaking tool hingedly connected to the column. The bead breaking tool when folded near the column may collide with a spring loaded locking pin during rotation of the column. The column also remains at a constant height so the gantry arm does not move vertically relative to a wheel. Rotation of the shaft away from the wheel calls for a worker to loosen the collar at the top of the shaft and then raise the shaft upwardly. The shaft has some weight and loosening the collar adds to the steps a worker must perform to load and unload wheels from the three arm frame.

The present invention overcomes the difficulties of a tool colliding with a column stop or wheel, a column keeping a fixed height, and rotation of the column relative to the frame.

SUMMARY OF THE INVENTION

Generally, the present invention provides a vertical component of a frame that has a base operably connected to a coaxial column. The base has a generally hollow square cross section while the column has a hollow round cross section slightly less in diameter than the width of the base. The base has feet upon one end for placement upon a floor and a lower plate upon the opposite end. The lower plate has a pattern of apertures. Within one foot, a pedal extends into the base and engages the column to raise it vertically. Upwardly from the lower plate, the column has an upper plate with its pattern of apertures, a side plate extending outwardly from the upper plate yet fitting upon two of the apertures, and a plurality of bolts secured through the pattern of apertures where the heads of the bolts engage the apertures in the lower plate. The side plate has an aperture that receives a stem that has a handle upon one end and a tab upon the opposite end. Turning of the handle places the tab beneath the lower plate, locking the column to the base while turning the handle in the opposite direction moves the tab away from the lower plate so that the column may elevate.

There has thus been outlined, rather broadly, the more important features of the invention in order that the detailed description thereof that follows may be better understood and that the present contribution to the art may be better appreciated. The present invention also includes a rib beneath the pedal, a stud upon one end of the column operably connected to the pedal, left hand threading of the stem, the stem locating outwardly of the perimeter of the lower and upper plates, and four locking positions. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved locking mechanism for a frame.

Another object is to provide such a locking mechanism for a frame that clamps a column to a base, preventing rotation of the column relative to the base and preventing elevation of the column from the base, when the mechanism is locked.

Another object is to provide such a locking mechanism for a frame that elevates a column through foot action of a user and allows rotation of the column relative to the base when the mechanism is unlocked.

Another object is to provide such a locking mechanism for a frame that operates without electrical, hydraulic, or pneumatic assistance.

Another object is to provide such a locking mechanism for a frame that has a low cost of manufacturing so the purchasing mechanics, bikers, garages, and shops can readily buy the locking mechanism for a frame through stores and supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing a locking mechanism with frame that allows rotation of one frame component relative to the remainder of the frame and also locks the frame component preventing rotation.

Figure 1:
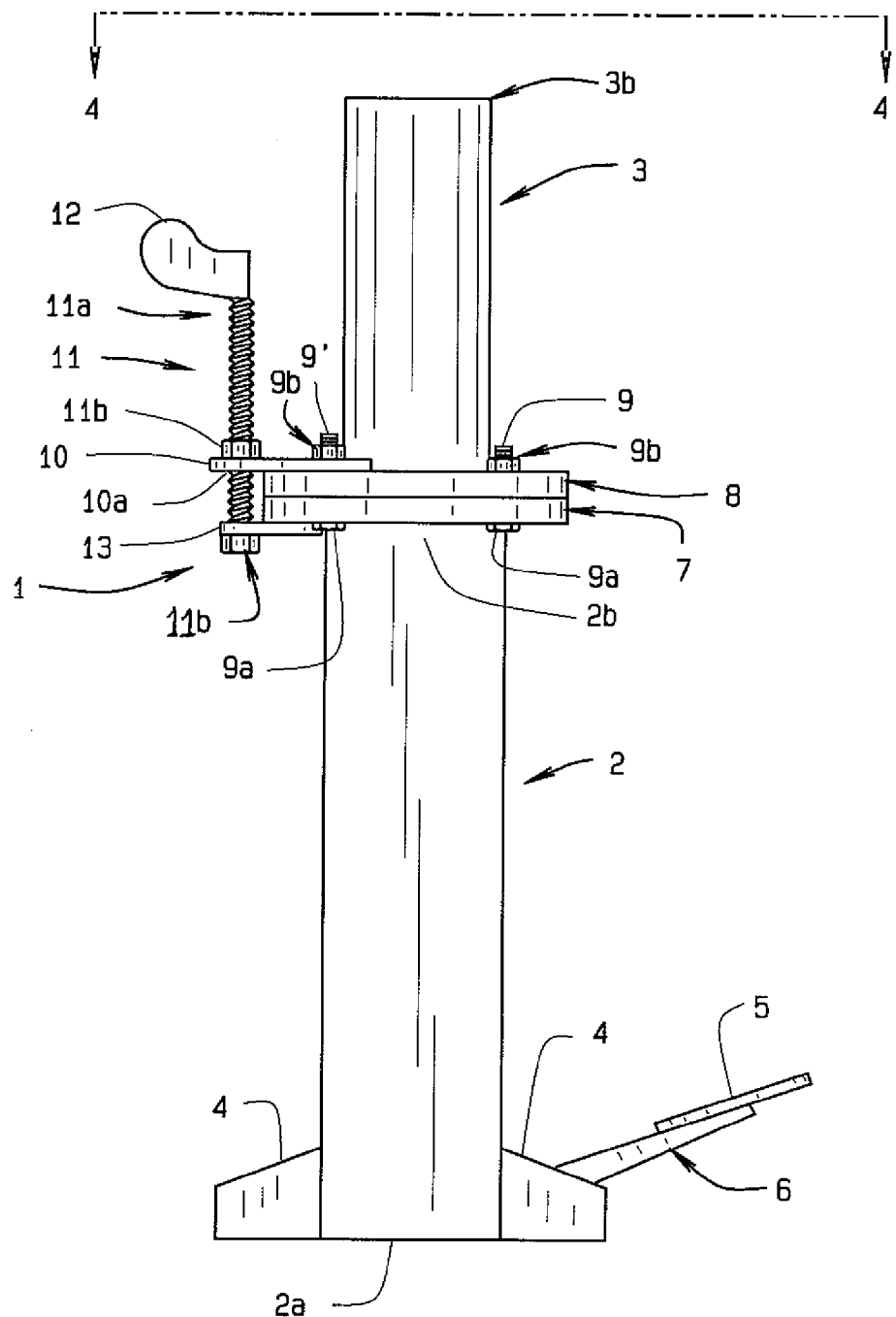
FIG. 1 shows a side view of a portion of a frame with a locking stem shown locked and constructed in accordance with the principles of the present invention.

Beginning on FIG. 1, a locking mechanism for a frame, or assembly, that is, the present invention 1 has an elongated base 2 having two opposite ends, a lower end 2a and an upper end 2b. Preferably, the base has hollow construction and a square cross section. Alternatively, the base has a rectangular cross section. A further alternative includes a base with a round cross section. The description continues in reference to a square cross section for the base and the base having a width, though round shapes with a diameter are also foreseen. Coaxial with the base 2, the invention 1 has a column 3 also with its lower end 3a and its upper end 3b. The upper end generally merges with the remainder of the frame while the lower end is shown in FIG. 8.

Returning to the base 2, the lower end has two mutually parallel and spaced apart feet 4. The feet have spacing outwardly from the base along a common line through the center of the lower end. As shown, the feet each have a generally trapezoidal shape with two parallel geometric bases and the longer base joins each foot to the base 2, preferably by welding. The feet each abut a common plane with the lower end 2a so that the base 2 stands perpendicular to a supporting surface such as a shop floor. The invention has a left foot 4 and an opposite right foot 4' to the right in FIG. 1. The right foot 4' allows passage for a pedal 5. The pedal is a generally elongated planar member that extends from outwardly of the right foot as shown, into the right foot, and then into the lower end 2a as later shown in FIGS. 7, 8. The pedal includes a rib 6 generally perpendicular to the plane of the pedal and has a position beneath the pedal towards the lower end 2a. The rib has a tapering shape with its narrowest thickness proximate the outer portion of the pedal so that upon the pedal descending, the rib has minimal limitation to the pedal. Opposite the feet 4, 4' and lower end 2a, the base has its upper end 2b that has the same cross section as the lower end. The upper end has joined to it a lower plate 7, generally round in shape with an annular form. The lower plate has a diameter exceeding the width of the base but by no more than the width again. The lower plate has an orientation generally perpendicular to the base, that is, parallel to the supporting surface. The lower plate has a pattern of apertures there through, preferably four equally spaced round apertures, as later shown in FIG. 6.

The column though also has an upper plate 8 generally opposite the upper end 3b and a position of approximately one quarter to one half of the length of the column. The upper plate is also round in shape with an annular form of the same outer diameter as the lower plate. The upper plate has its pattern of apertures there through that generally align with the apertures 7a of the lower plate. The upper plate though admits a bolt 9 into each aperture so that the bolts extend parallel to the column. Each bolt has a head 9a generally extending downwardly from the upper plate, that is, away from the column, as later shown in FIG. 3. The head has a generally round shape, slightly larger than the bolt, and a hex shaped depression. Inwardly from the upper plate, each bolt 9 has a nut 9b that rotates against the upper plate, that is, towards the column. Rotation of the bolt clamps the head 9a against the upper plate 9 for securement against axial and rotational movement. Preferably, the column has four bolts 9 equally spaced around the circumference of the upper plate.

The upper plate has its generally round shape with the preferred four bolts where two adjacent bolts denote a quadrant, or quarter, of the upper plate. One pair of adjacent bolts, here denoted 9', also secure a side plate 10. The side plate has a generally right triangular shape with its two corners away from the right angle having a generally rounded form. The side plate has sufficient depth so that the two sides 10b have mutual tangency to the upper plate. The side plate generally extends outwardly from the upper plate. The side plate has its aperture 10a located proximate the right angle so that the side plate appears symmetric in a top view. The aperture 10a admits a stem 11 there through. The stem has left hand threading 11a and a length approximately 33% greater than the length of the bolts 9. The stem is generally a solid cylinder with its threading and two opposite ends. Upon one end, the stem has a handle 12 extending perpendicular to the stem and the column, and having a generally planar shape. Upon the other end, the stem has a tab 13 generally opposite that of the handle. The tab is planar and perpendicular to the column but parallel to the side plate, that is, perpendicular to the handle. A nut 11b secures the tab at the other end of the stem while another nut 11b secures the stem 11 to the side plate.

In this figure, the tab 13 has an orientation beneath the lower plate while the handle points away from the column. The tab in this orientation prevents lifting of the column relative to the base as the tab engages the lower plate. The heads 9a fit into the apertures of the lower plate and thus prevent rotation of the upper plate and its joined column relative to the lower plate and its joined base.

Figure 2:
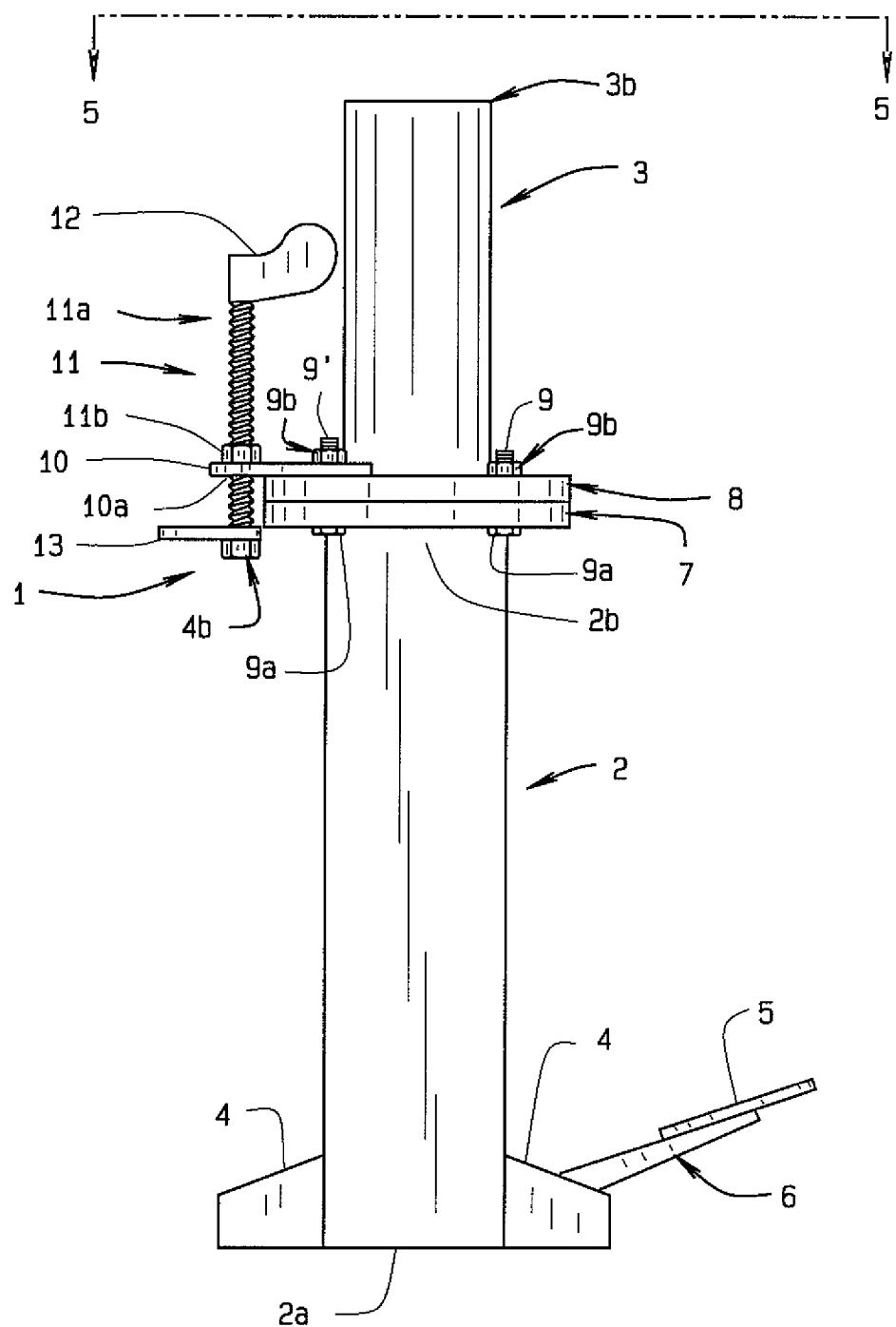
FIG. 2 shows a side view of the present invention with the locking stem shown unlocked.

Previously, FIG. 1 showed the present invention in its locked position where the column 3 does not move axially relative to the base 2. FIG. 2 then shows the beginning of the unlocked position for the invention 1. In this figure, the handle 11a rotates towards the column 3. As the handle rotates, the stem joined to the handle also turns through the nut 11b and the aperture 10a in the side plate 10. With the handle oriented in the opposite direction of the tab, rotation of the handle towards the column turns the tab 13 outwardly from the lower plate 7. The tab has rotated away from the lower plate in this figure so that the column moves axially relative to the base.

Figure 3:
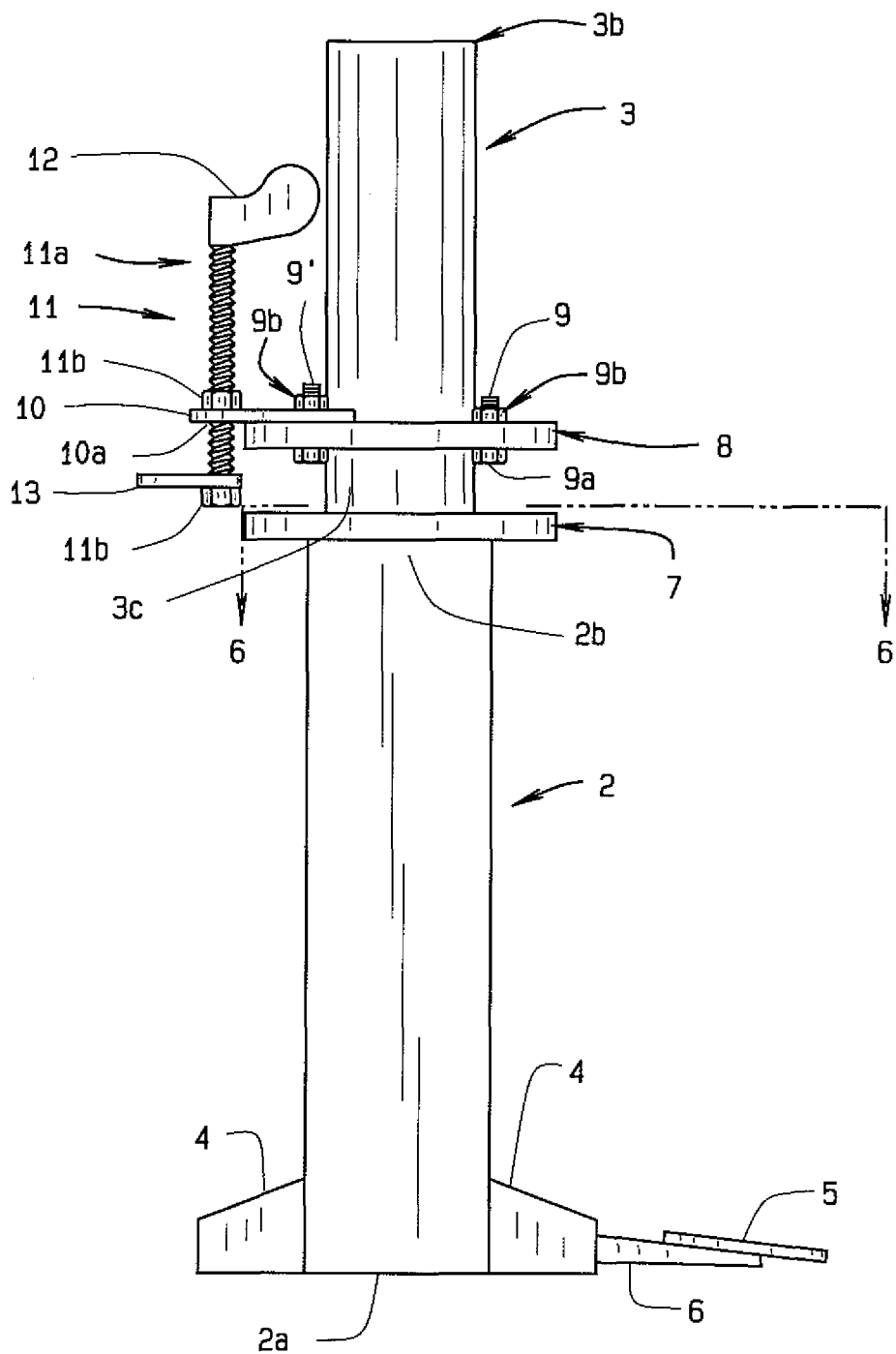
FIG. 3 shows the side view of the present invention with the column elevated from the base as the locking stem is unlocked.

To move the column axially, a user steps upon the pedal 6 to its lowest position as shown in FIG. 3. The pedal engages the column 3, as later shown in FIG. 7, so that movement of the pedal raises the column as in FIG. 3 and later allows a user to lower the column as desired. With the tab 13 away from the lower plate 7, the column moves axially away from the base. In doing so, a gap opens between the lower plate and the upper plate 8 as shown. Within the gap, the continuation of the column can be seen, as at 3c, because the column continues within the base until it reaches the pedal as later shown. With the column elevated slightly, the upper plate 8 shows the bolts 9 connected to it. Each of the preferably four bolts 9 secures to the upper plate using a nut 9b upon the upper surface of the plate, that is, towards the column. Upon the lower surface of the plate, that is, towards the base, each bolt has a head 9a with a width slightly larger than the aperture in the upper plate for the bolt. With the cooperation of the head, the nut, and the upper plate, the bolt remains in position through its operating hours. In this figure, the bolts have lifted away from their cooperating apertures in the lower plate as later shown in FIG. 6. Though this figure happens to show three bolts, the preferred embodiment includes four bolts generally arranged in an equiangular manner.

Figure 4:
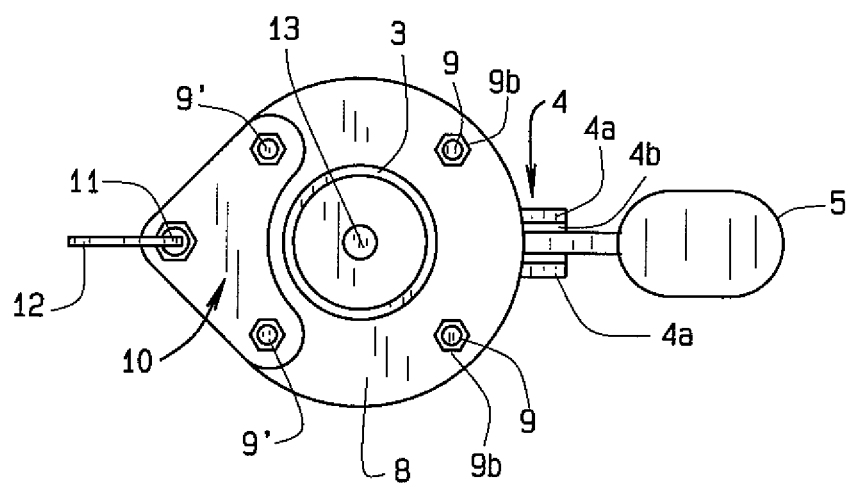
FIG. 4 describes the top view of the column with the locking stem shown locked similar to FIG. 1.

Having shown the locking, unlocking, and axial lifting of the column out of the base, FIG. 4 shows a top view of the column 3 of the invention 1, with the handle 12 away from the column thus locking the column in position. FIG. 4 relates to FIG. 1. The handle extends outwardly from the side plate 10, preferably tangent to the upper plate. The axis of the stem 11 generally parallels the axes of two adjacent bolts 9' and the spacing of the stem relative to the two adjacent bolts forms a substantially right angle. The side plate has a somewhat right triangular shape with the hypotenuse rounded to follow the exterior surface of the column. The side plate has an aperture 10a that admits the stem and two other apertures that align with apertures 9c in the upper plate that admit two bolts 9. Nuts 9b secure the bolts to the side plate as previously described.

Outwardly from the side plate, this figure has one foot 4 in the background and generally extending perpendicular to an edge of the upper plate 8. The foot has a generally U shaped cross section with two spaced apart flanges 4a extending upwardly from a web 4b. The foot has a position at the bottom of the base 2 so it is in the background relative to the upper plate 8 shown. Clockwise from the foot and the side plate 10, the upper plate continues around the circumference of the column 3. The upper plate has an inside diameter approximately that of the outside diameter of the column and an outside diameter that provides an annular width sufficient to support the nuts 9b. Opposite the side plate, the base 2 has a second foot 4 here shown to the right of the figure. This foot also has two flanges 4a shown and a web 4b concealed by the pedal 5. The pedal has a length greater than that of the foot and extends outwardly from the foot in a user friendly shape, here shown as oblong. The pedal extends into the base 2 for lifting the column 3 as later described in FIG. 7. Generally in line with the two feet 4 and centered in the upper plate 8, the column 3 has a hollow round cross section with an internal stud 13. In this figure, the stud appears in the background at approximately the same depth as the feet because the stud engages the pedal for elevating the column as later shown.

Figure 5:
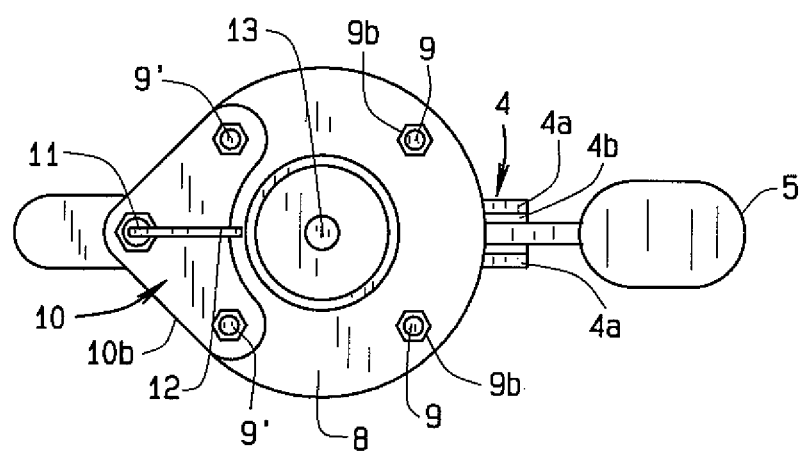
FIG. 5 illustrates a top view of the column with the locking stem shown unlocked similar to FIGS. 2, 3.

From time to time, a user of the frame including the invention 1 seeks to lift the column and unlock it for rotation. To do so, a user turns the handle 12 inwardly towards the column as shown in FIG. 5. FIG. 5 again shows a top view of the column 3 of the invention 1, but with the handle 12 towards the column. Opposite the handle, the tab 13 extends outwardly from the side plate 10 and generally parallel to the foot 4. FIG. 5 generally relates to FIGS. 2, 3. The tab, free of the lower plate, unlocks the column from the base so that the column and attached upper plate lift upwardly from the lower plate and rotate relative to the base. The column may rotate at least 270 degrees.

Figure 6:
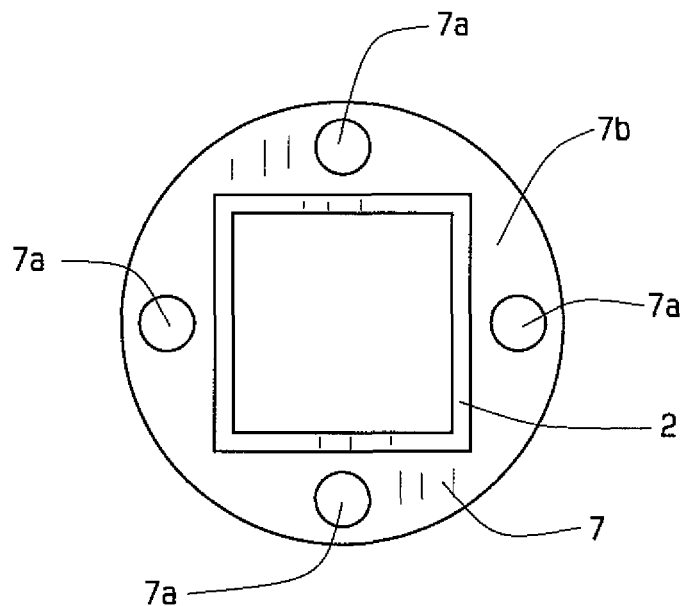
FIG. 6 shows a sectional view of the base with the lower plate in the background.

Partially disassembling the invention, FIG. 6 shows a top view of the lower plate 7 with the column removed. The lower plate has an outside diameter that matches that of the upper plate. Within the lower plate, it has a centered square opening 7b that allows for a snug fit of an upper end 2b of the base 2. The base is generally welded to the lower plate. The width of the base, and hence the square opening, has enough size to admit the outside diameter of the column. The square opening imparts four equal sides, or chords, to the lower plate. In each chord, the lower plate has an aperture 7a with a diameter to admit the head 9a of a bolt 9 secured to the upper plate. As the bolt heads rotate upon the lower plate, the column turns relative to the base for a minimum of 90 degrees. Upon turning that amount, the bolt heads slip into the apertures 7a thus preventing further rotation. A user can hold the pedal down, lifting the column so that the heads of the bolts pass over the apertures 7a for rotations beyond 90 degrees. In the preferred embodiment, the lower plate has four apertures corresponding to the four bolts 9 secured to the upper plate.

Figure 7:
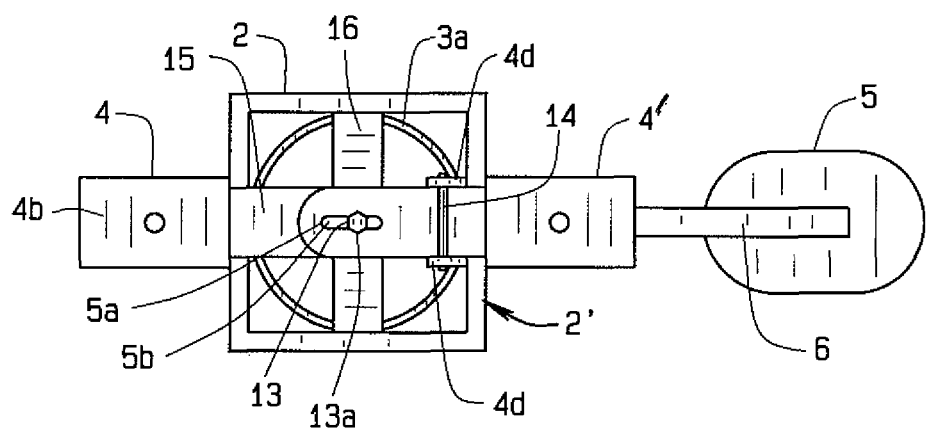
FIG. 7 provides a bottom view of the base with the column shown nested therein and connected to the pedal; and, FIG. 8 illustrates an exploded view of the locking stem with frame of the present invention.

Opposite FIG. 6, FIG. 7 shows a bottom view of the base 2. The base has a generally hollow square shape, preferably square tube steel, with the foot 4 upon one side. As a bottom view, FIG. 7 shows the web 4b of the foot, also with a centered opening for anchoring the invention to a supporting shop or garage floor with an anchor bolt, not shown. Opposite the foot, the base has the second foot, as at 4', and showing the web 4b also with a centered opening for anchoring. Outwardly from the second foot, the pedal 5 has its distinctive shape and width exceeding that of the second foot. The pedal includes the rib 6 extending from the wider section of the pedal inwardly through the foot towards the base. The rib is perpendicular to the pedal and generally centered upon the lower surface of the pedal. The rib has a generally triangular shape with its narrow tip towards the wide portion of the pedal so that the rib accommodates movement of the pedal downwardly during usage. The rib and the pedal extend inwardly through the second foot 4'. The rib stops just inside of the base while the pedal continues inwardly to beyond the stud 13 with a portion of the pedal called the tongue 5a. The tongue has less width than the wide portion of the pedal but defines the width for the majority of the pedal. The tongue has a slot 5b that receives the stud 13. The pedal rotates upon a pin 14, slightly inward from the wall as at 2' and generally parallel to that wall, that is, perpendicular to the rib 6. The pin rests upon extensions 4d of the flanges 4a of the second foot 4'. The extensions enter within the base but do not reach the midpoint of the base. Opposite the pin 14, the base has a strap 15 that extends inwardly from the foot towards the center of the base. The strap has less width than the foot and about the same width as the pedal. Perpendicular to the strap and parallel to the pin, the base has a spanner 16. The spanner is generally centered upon the base and extends across the width of the base. The spanner has a centered aperture that admits the stud 13 that then passes through the slot 5b of the pedal before receiving securement by a nut 13a.

Upon placing the invention in the shop or garage, a user steps upon the pedal, pivoting it down upon the pin which raises the tongue 5a to elevate the column 3. The stud generally remains in contact with the tongue but slides through the spanner. The spanner has a slight elevation upwardly from the web of the foot 4 that allows for movement of the stud. To lower the column, a user gently lifts up from the pedal, lowering the tongue and the stud by gravity.

And FIG. 8 shows an exploded view of the present invention beginning with the column 3. The column, generally round, cylindrical, and hollow has the upper end 3b that merges with the remainder of the frame and the opposite lower end 3a that passes within the base 2 for connection to the pedal 5. The lower end has the stud 13 connected to it, generally in the center. The stud includes threading to receive a nut 13a that secures the tongue 5a of the pedal to the stud. The column then joins to the upper plate 8 nearly at the mid point of its length as at 3d. The location of the upper plate along the column positions the stud at its lowest point when the pedal is released. The upper plate then receives preferably four bolts 9 through corresponding apertures 9c. Each bolt has its head 9a here shown generally wider than the apertures 9c, a threaded shank, and nut 9b that secures upon the shank. When assembled, all of the bolts 9 extend in the same direction away from the upper plate towards the column. The bolts secure to the upper plate with each head upon the lower surface of the upper plate, each shank extending through the aperture 9c, and each nut turning upon the shank to secure the head tightly against the upper plate.

Two adjacent bolts also provide securement for the side plate 10. The side plate occupies approximately one quadrant of the upper plate when assembled. The side plate rests upon the upper surface of the upper plate and the nuts 9b of two bolts secure the side plate upon the upper plate. The upper plate has its somewhat triangular shape, here shown on edge, with the inside angle outwardly from the column, that is, towards the left in the figure. The side plate receives the stem 11 inserted through the aperture 10a in the side plate proximate the inside angle. The stem secures to the lower surface of the side plate with a nut 11a beneath the tab 13. The tab has a generally rectangular shape that extends outwardly and perpendicular to the stem. Generally opposite the tab and the nut and perpendicular to the tab, the handle 12 extends outwardly from an end of the stem. As described previously, as the handle approaches the column, the tab rotates outwardly from the upper plate and as the handle retreats from the column, the tab turns under the lower plate securing the column against axial movement.

Beneath the upper plate in the figure, the lower plate 7 generally aligns beneath the upper plate 8. The lower plate includes the centered opening 7b that receives the upper end 2b of the base 2. The lower plate also has four apertures 7a that receive the heads 9a of the bolts as previously shown in FIG. 6. The lower plate generally has the same outside diameter as the upper plate and is parallel to the upper plate. That is, the lower plate and the upper plate are both generally perpendicular to the lengths of the base and the column.

As shown, beneath the lower plate, the invention includes the base 2 with its upper end 2b and the opposite lower end 2a. The base has a generally square cross section with four sides where this figure shows one side. The upper end joins to the lower plate 7 and the lower end receives the mechanism for elevating the column and rests upon a supporting floor. Upon perpendicular sides to the one shown, the lower end also has slots that receive the feet.

In the left of the figure, the lower end receives the foot 4 with its two spaced apart flanges 4a, here shown in a trapezoidal shape with the shorter height outwardly. The flanges abut the wall of the base for securement, typically by welding. Opposite the foot 4 to the right of the figure, the second foot 4' secures to an opposite side of the base so that the second foot is generally in line with the foot as previously shown in FIG. 7. The second foot also has two flanges 4a in a trapezoidal shape similar to that of the foot. These flanges extend into shoulders 4d, or extensions, of a lesser height than the maximum of the second foot and have a notch 4e upwardly from the lower end of the base. The shoulders also fit into a slot in this side of the base while these notches also engage the wall of the base.

Beneath the base 2 as shown, the figure provides the assembly that raises and lowers the column relative to the base. This assembly has at least one strap 15 here shown on edge. Perpendicular to the strap, this assembly includes the spanner 16 previously shown from below in FIG. 7. The spanner has a generally U shape with two downward flanges 16a and two outward wings 16b. The flanges, mutually parallel and spaced apart, extend beneath the wings and allow for securement of the spanner to the inside of the lower end 2a of the base. An aperture generally centered in the spanner admits the stud 13. The stud then connects to a nut 13a, passes through a washer 13b, then the tongue 5a outwardly from the pin, and secures to another nut 13a beneath the tongue. The tongue includes a slot through which the stud passes and that permits the tongue to rotate upon the pin 14 that supports the pedal 5. And the pedal has a generally elongated shape that receives the stud upon one end and accepts a user's foot upon the other wider end as previously described. Beneath the pedal, the rib 6 extends perpendicular to the pedal from beneath the wide portion of the pedal to just before the pin, that is proximate the shoulders 4d. The components so described assemble into a compact form as shown so that a user lifts the column using the lever action between the pedal, pin, and stud. This invention operates upon muscle power alone without hydraulic or pneumatic assistance. Though this description refers to bolts 9 utilized to prevent rotation of the column relative to the base, the Applicant foresees welded pins or bosses upon the upper plate as substitutes for bolts.

From the aforementioned description, a locking mechanism for a frame has been described. The locking mechanism for a frame is uniquely capable of locking a stem against rotation and opening the lock with no hands from a user. The locking mechanism for a frame and its various components may be manufactured from many materials, including but not limited to, ferrous and non-ferrous metals, their alloys, nylon, polymers, polyvinyl chloride, high density polyethylene, polypropylene, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An assembly for locking and unlocking a frame component for elevation and rotation, comprising:
   a base, generally hollow and elongated;
   a column, generally hollow and elongated, said column telescoping from said base;
   a lower plate joining to said base, said lower plate being perpendicular to said base;
   an upper plate joining to said column, said upper plate being generally parallel to said lower plate wherein said upper plate abuts said lower plate locking said frame component and wherein said upper plate remains spaced away from said lower plate unlocking said frame component for elevation and rotation of said column relative to said base;
   a pedal opposite said lower plate, said pedal cooperating with said column for elevation thereof; and,
   a stem connecting to said upper plate and having a handle and an opposite tab, said tab abutting said lower plate for locking said column against elevation.

2. The frame component locking and unlocking assembly of claim 1 further comprising:
   a side plate connecting to said upper plate, said side plate extending outwardly from said upper plate, and said side plate having an aperture there through;
   said stem having a generally elongated rod shape, two opposite ends, said handle upon one end generally outwardly of said upper plate towards said column and said tab upon the other end generally proximate said lower plate, said stem having threading;
   said tab having a generally planar shape, said tab extending perpendicular to said stem and generally parallel to said lower plate;
   said handle having a generally planar shape, said handle extending perpendicular to said stem and opposite said tab, and said handle extending perpendicular to said tab; and,
   wherein turning said handle towards said column moves said tab outwardly from said lower plate thus unlocking said assembly and turning said handle away from said column moves said tab inwardly beneath said lower plate thus locking said assembly.

3. The frame component locking and unlocking assembly of claim 2 wherein said stem has left hand threading.

4. The frame component locking and unlocking assembly of claim 2 wherein said tab has a generally rectangular shape and said handle has an oblong shape.

5. The frame component locking and unlocking assembly of claim 2 wherein said tab has an oblong shape.

6. The frame component locking and unlocking assembly of claim 1 further comprising:
   said column having a length, an upper end, and an opposite lower end;
   said base having a length, an upper end, and an opposite lower end;
   said column having a stud joining thereto proximate its lower end, said stud extending axially beneath said column;
   said base having a pedal operatively engaging said stud, said pedal positioning proximate its lower end, said pedal pivoting about an axis parallel to a tangent of said column; and,
   wherein upon a user depressing said pedal, said pedal rotates away from said column thus pushing said stud upwardly and lifting said column and wherein upon a user releasing said pedal, said pedal rotates towards said column thus descending said stud and lowering said column.

7. The frame component locking and unlocking assembly of claim 6 further comprising:
   said pedal having an elongated shape with an oblong end outwardly of said column and a tongue of narrower width than said oblong end extending for the majority of the length of said pedal, said pedal including a pin extending perpendicular to the length of said tongue;
   said base having a aperture parallel to its length, said aperture admitting said tongue within said base; and,
   a foot having an generally U shape, two mutually parallel and spaced apart flanges joined by a web, said web being in the plane of said lower end of said base, each of said flanges having a shoulder of lesser height than said flange, said flanges extending within said base and operatively engaging said pin wherein said pedal rotates upon said foot while raising or lowering said column.

8. The frame component locking and unlocking assembly of claim 7 further comprising:
   said tongue having an elongated slot outwardly of said pin, said elongated slot connecting to said stud; and,
   said pedal having a rib perpendicular to said pedal and beneath said pedal, said rib having a generally triangular shape with a tip positioned beneath the oblong end of said pedal and an inside angle positioned beneath said tongue.

* * * * *